Patented May 8, 1945

2,375,355

UNITED STATES PATENT OFFICE 2,375,355

SELENIUM RECTIFIER

Gustaf Edvard Fåhraeus, Stockholm, Axel Rudolf Lindblad, Djursholm, and Sven Johan Walldén, Stockholm, Sweden, assignors to Bolidens Gruvaktiebolag, Stockholm, Sweden, a joint-stock company limited of Sweden No Drawing. Application December 4, 1943, Serial No. 512,974. In Sweden May 17, 1940

3 Claims. (Cl. 175—366)

The present invention relates to methods for manufacturing electrode systems having an unsymmetrical electric conductivity and containing an electrode which consists substantially of selenium (and more particularly is concerned with a special step of said manufacture).

According to the present invention the surface of the selenium rectifier during its manufacture is subjected to a special treatment with appropriate fluids or solutions. This (surface) treatment is effected when the selenium has been converted into the good conducting crystalline modification but prior to the application of a counter electrode on the surface of the selenium. By thus treating the surface of the selenium the checking resistance of the rectifier is highly increased, whereas by suitable treatment the resistance in the working direction is not changed substantially. It has been found, moreover, that rectifier plates treated according to the invention are able to withstand a higher checking voltage than those that have not been subjected to such treatment. This last fact of course imports a great economic gain as it allows a reduction of the number of the elements connected in series in the rectifier.

Minor improvements may be obtained by treating the surface of the selenium with most kinds of fluids or solutions. Thus most of the usual washing agents such as trichlorethylene, carbon tetrachloride, ether, benzene, heptane, turpentine, acetone and alcohol have proved to have a favourable influence. A special group of fluids and solutions, however, have proved to be highly superior as to the results obtained, viz., such ones as have an etching effect on the free surface either by dissolving selenium or oxidizing selenium into easily soluble oxides which then may be washed off the surface and in this way to remove impurities that are contained in the surface layer of the selenium.

To the first group belong among other substances the alkali hydroxides and ammonia, and further ammonium selenide, sodium selenide and sodium sulphide. To the second group belong such substances as hydrogen peroxide and nitric acid as well as aqueous solutions of chlorine and bromine.

In treating the selenium surface with such fluids as for instance aqueous solutions of ammonium selenide or sodium hydroxide, a very thin layer of amorphous selenium is formed which contributes to the augmentation of the checking resistance of the rectifier element.

The following is a description of the manufacture of a selenium rectifier exemplifying the use of the present invention.

A thin layer of selenium or a layer substantially consisting of selenium is applied to a suitable supporting electrode. If necessary the selenium is transformed in the known manner into the good conducting variety by means of a combined pressure and heat treatment.

The selenium plate then, according to the invention, is treated during a predetermined time with a suitable fluid or solution. It has been found that the concentration of the solution and the time for its action upon the selenium plate may be varied within comparatively wide limits without any substantial change occurring with regard to the results obtained. When hydrogen peroxide was used the solution usually had a concentration of 30 per cent and the appropriate time for treating was found to be about one minute. Quite naturally the same result may be obtained by means of a weaker solution and a longer treatment as with a comparatively stronger solution and a short treatment.

After the treatment the plates are carefully washed, first in running water and afterwards in absolute alcohol and then they are dried in a stream of heated air.

To the selenium surface then at last the counter electrode is applied, which step is usually effected by means of spraying a suitable easily melting alloy on to it. This spraying operation should be effected as soon as possible after the above named surface treatment.

There exist several different methods for manufacturing selenium rectifiers and it will be understood that the invention is not limited to any special mode of manufacturing so that it will be of advantage to use the invention with any desired method for manufacturing selenium rectifiers.

It is also known that by adding certain substances to the selenium it is possible to increase its conductivity considerably and in this way decrease the resistance of the rectifier in the working direction. If such substances are added, however, it has been found that generally the checking resistance will also be lowered considerably, for which reason the practical advantage of such additions seems to be very insignificant. A rectifier manufactured in accordance with the present invention, however, will even in such a case show good checking properties. As, due to the added substances, such rectifiers have a low transmitting resistance and thus low losses, they will be superior to rectifiers manufactured in the usual way.

Having thus described our invention we declare that what we claim is:

1. In manufacturing selenium rectifiers by applying a layer of selenium to an appropriate supporting electrode, transforming the selenium into the good conducting crystalline modification and applying a counter electrode, the step which consists in treating the selenium surface, after the selenium has been transformed into the said crystalline modification but before the application of the counter electrode, with a reagent having an etching effect on the selenium surface and selected from the class consisting of chlorine and bromine.

2. A method as claimed in claim 1, characterized by treating the selenium surface with an aqueous solution of chlorine.

3. A method as claimed in claim 1, characterized by treating the selenium surface with an aqueous solution of bromine.

GUSTAF EDVARD FÅHRAEUS.
AXEL RUDOLF LINDBLAD.
SVEN JOHAN WALLDÉN.